United States Patent [19]

Miwa et al.

[11] Patent Number: 4,747,006
[45] Date of Patent: May 24, 1988

[54] MAGNETIC HEAD HAVING FLUID PRESSURE MEANS

[75] Inventors: Hiroshi Miwa; Youichi Muratomi, both of Amagasaki, Japan

[73] Assignee: Mitsubishi Denki Kabushiki Kaisha, Tokyo, Japan

[21] Appl. No.: 871,865

[22] Filed: Jun. 9, 1986

[30] Foreign Application Priority Data

Jun. 13, 1985 [JP] Japan ................... 60-128675
Dec. 18, 1985 [JP] Japan ................... 60-285014
Feb. 21, 1986 [JP] Japan ................... 61-36563

[51] Int. Cl.$^4$ .......... G11B 15/60; G11B 5/10; G11B 17/32
[52] U.S. Cl. ................... 360/130.3; 360/102; 360/129
[58] Field of Search ............. 360/102, 103, 130.3, 360/130.31–130.34, 128, 129

[56] References Cited

U.S. PATENT DOCUMENTS

| | | |
|---|---|---|
| 3,418,434 | 12/1968 | Groenewegen . |
| 3,818,506 | 6/1974 | Kelch et al. ............. 360/130.34 |
| 3,886,594 | 5/1975 | Toussan ............. 360/102 |
| 4,071,854 | 1/1978 | Bijon et al. ............. 360/102 |
| 4,151,573 | 4/1979 | Tandon et al. ............. 360/104 |

FOREIGN PATENT DOCUMENTS

| | | | |
|---|---|---|---|
| 52-45310 | 4/1977 | Japan | ............. 360/130.31 |
| 54-105505 | 8/1979 | Japan | ............. 360/130.31 |
| 57-138019 | 8/1982 | Japan | ............. 360/113 |
| 58-218072 | 12/1983 | Japan | ............. 360/103 |
| 60-749 | 1/1985 | Japan | . |

OTHER PUBLICATIONS

Fulton, "Pneumatic Brake/Pressure Pad for Tape Transport", RCA Technical Notes, No. 498, Sep. 1961.

*Primary Examiner*—John H. Wolff
*Assistant Examiner*—Matthew J. Bussan
*Attorney, Agent, or Firm*—Oblon, Fisher, Spivak, McClelland & Maier

[57] ABSTRACT

A magnetic head comprises a magnetic pole placed at a position to effect a magnetic function to a magnetic recording medium to be driven; a medium supporter which is placed opposing the magnetic pole with respect to the magnetic recording medium with a certain gap between the medium supporter and the magnetic recording medium, and which has a cavity at the portion opposing said magnetic pole and a flat portion having a spread surface area formed around the cavity opposing the magnetic pole; and a fluid supplied to the cavity so that the magnetic recording medium is brought to contact with the magnetic pole by a force of the pressurized fluid from the cavity and is supported by a negative pressure produced at the flat portion.

9 Claims, 6 Drawing Sheets

MAGNETIC HEAD HAVING FLUID PRESSURE MEANS

BACKGROUND OF THE INVENTION

Field of the Invention

The present invention relates to a magnetic head. More particularly, it relates to a structure for supporting a magnetic recording medium (hereinbelow, referred to as a recording medium) to be used for the magnetic head in, for instance, a floppy disk drive unit.

When there is a minute gap or spacing between a magnetic head and a recording medium in, for instance, a floppy disk drive unit, the output of a signal written in or reproduced from the recording medium is attenuated.

In case of reproduction of the signal, the output loss L is expressed as follows:

$$L(\text{dB}) = 55 \frac{d}{\lambda}$$

where d is an amount of the spacing and λ is the wavelength of a signal recorded in the recording medium. Namely, the wavelength of 1 μm causes loss of about 6 dB even though the spacing is only 0.1 μm.

A vertically magnetizing and recording system enables the wavelength of a recorded signal to be shorter than that of a conventional horizontally magnetizing and recording system. Accordingly, more careful consideration should be made on the spacing in the floppy disk drive unit employing a vertically magnetizing and recording medium. Various measures have been taken to minimize the loss.

FIG. 11 is a diagram showing the conventional vertically magnetizing and recording head, in cross-section, disclosed in Japanese Unexamined Patent Publication No. 82220/1982. In FIG. 11, a reference numeral 1 designates a main magnetic pole comprising a high magnetically permeable thin film 1a and a non-magnetic holder 1b. A numeral 2 designates an auxiliary magnetic pole opposing the main magnetic pole 1. The main and auxiliary magnetic poles 1, 2 constitute a magnetic pole assembly for recording magnetic signals in a magnetic recording medium and for reproducing the signals recorded in the medium. A numeral 3 designates a coil wound on the outer periphery of the auxiliary magnetic pole 2 to effect recording and reproducing of the magnetic signals; a numeral 4 designates a resilient body such as felt mounted on the top surface of the auxiliary magnetic pole 2; a numeral 5 designates a magnetic recording medium to be placed between the main magnetic pole 1 and the auxiliary magnetic pole 2, and a numeral 6 designates a spring means such as a coiled compression spring which applies a load to the auxiliary magnetic pole 2 whereby the recording medium 5 is held by the main magnetic pole 1 and the resilient body 4. Accordingly, a gap or a spacing formed between the main magnetic pole 1 and the recording medium 5 is minimized by the spring action of the spring means 6.

However, in the conventional magnetic head, when the recording medium 5 is moved in the direction indicated by an arrow mark as shown in FIG. 12, a force caused by a friction produced between the recording medium 5 and the resilient body 4 acts on a contacting area whereby the resilient body 4 is deformed, which results in ununiform contacting pressure of the recording medium 5 to the main magnetic pole 1.

A phenomenon of stick slip is produced due to a frictional force between the recording medium 5 and the resilient body 4 having specified characteristics, and a pressure of contact varies with the lapse of time. When the felt is used as the resilient body 4, it is difficult to control the thickness of it. Especially, when a contacting force of the spring means 6 is poor, it is extremely difficult to maintain a uniform pressure of contact between the recording medium 5 and the main magnetic pole 1. In the conventional magnetic head, it is necessary to increase a pressure of contact by means of the spring means 6 in order to stably maintain the spacing between the main magnetic pole 1 and the recording medium to be 0.1 μm or lower. In this case, however, wearing and damage of the main magnetic pole 1 and the recording medium 5 are disadvantageously caused even though a stable pressure of contact can be obtained. Further, if fine particles are deposit on the surface of the resilient body 4, the recording medium 5 is damaged so that restoration of the recording medium is impossible.

Thus, the conventional magnetic head had the problem that an ununiform pressure of contact is easily caused between the main magnetic pole 1 and the recording medium 5 due to deformation of the resilient body 4 and uneven thickness of the resilient body. While a strong contacting force is needed to minimize the spacing and to maintain the spacing under stable condition, a strong contacting force inevitably results wearing of the magnetic head and damage of the recording medium to thereby invite dropping out of signals and breakage of recorded data whereby reliability of the magnetic head is impaired.

FIG. 13 is a diagram showing another conventional magnetic head as disclosed in Japanese Unexamined Utility Model Publication No. 749/1985. The magnetic head is so constructed that the recording medium 5 is urged to a magnetic pole 16 by an air ejected from a nozzle 15 which is connected to an air compressor 13 through a pipe 14. However, a region where a pressure given by the air is applied is extremely small, and the force is approximately equal to a concentrated load. Accordingly, although the recording medium can be brought to contact with the magnetic pole, deformation of the recording medium at an early stage and a slanting movement (movement of seesaw) of the recording medium during its revolution can not be suppressed. Further, in the conventional magnetic head, since a highly pressurized air is ejected in the atmosphere, excessive disturbance of an air stream takes place at the end of the ejected air stream (which is called fluttering phenomenon), whereby the slanting movement of the recording medium is further remarkable.

SUMMARY OF THE INVENTION

It is an object of the present invention to provide a magnetic head for minimizing deterioration of signals such as signal-dropping-out and being highly reliable.

The foregoing and the other objects of the present invention have been attained by providing a magnetic head which comprises a magnetic pole placed at a position to effect a magnetic function to a magnetic recording medium to be driven; a medium supporter which is placed opposing the magnetic pole with respect to the magnetic recording medium with a certain gap between the medium supporter and the magnetic recording medium, and which has a cavity at the portion opposing the magnetic pole and a flat portion having a spreaded surface area formed around the cavity opposing the magnetic pole; and a fluid-pressurizing and forwarding means for forcibly supply a fluid to the cavity so that the magnetic recording medium is brought to contact with the magnetic pole by a force of the pressurized fluid from the cavity, while it is supported by a negative pressure produced at and near the flat portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
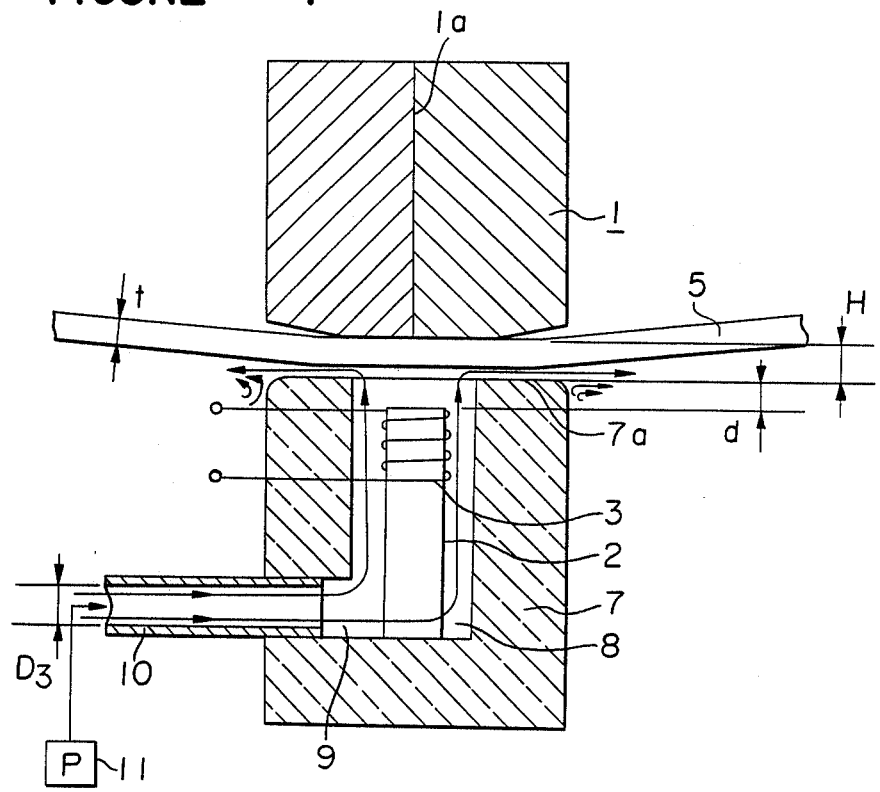
FIG. 1 is a longitudinal cross-sectional view of an embodiment of the magnetic head of the present invention.

In the following, the present invention will be explained in detail with reference to preferred embodiments as shown in the accompanying drawings, wherein the same reference numerals designate the same or corresponding parts.

Figure 2:
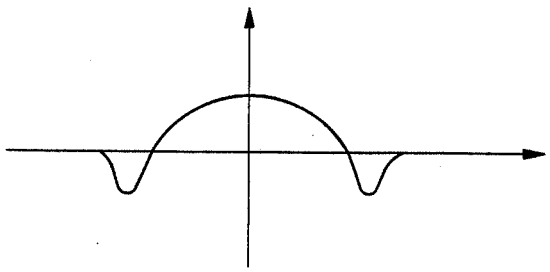
FIG. 2 is a diagram showing distribution of a fluid pressure produced in the radial direction of a medium supporter according to an embodiment of the present invention.
Figure 3:
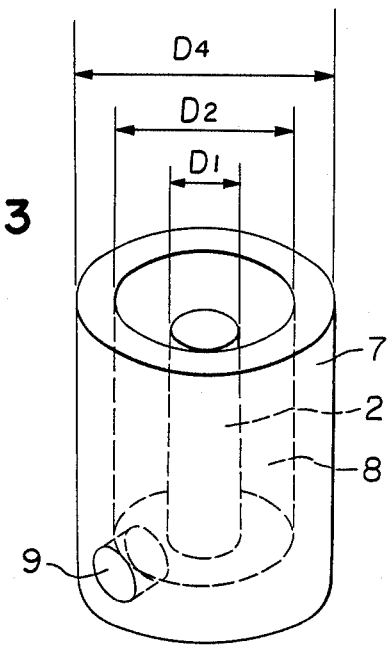
FIG. 3 is a perspective view showing the medium supporter shown in FIG. 1.

In FIGS. 1 to 3, a reference numeral 7 designates a medium supporter made of a non-magnetic material such as ceramics including barium titanate as the major component. The medium supporter is in a cylindrical shape having the outer diameter $D_4$ (the outer diameter $D_4$ is, for example, about 3 mm or smaller) and is arranged opposing a surface of the main magnetic pole 1 comprising a first surface. The recording medium 5 is interposed between the main magnetic pole 1 and a surface of the medium supporter 7 comprising a second surface with a gap with respect to the main magnetic pole 1. The medium supporter 7 has a cylindrical cavity having the inner diameter $D_2$ at a portion facing the main magnetic pole 1 and a flat portion 7a having a spreaded surface area which is formed around the cavity opposing the magnetic main pole.

A cylindrical through hole 9 is laterally extended in the bottom portion of the medium supporter and a conduit 10 having the inner diameter $D_3$ is connected to the through hole 9. At the center of the cavity of the medium supporter, there is arranged an auxiliary magnetic pole 2 having the diameter of $D_1$. The auxiliary magnetic pole 2 is mechanically connected to the medium supporter 7 and the upper end surface of the auxiliary magnetic pole 2 is at lower level than the flat portion of the medium supporter 7 so that the distance between the upper end surface and the flat portion is d ($>0$). The inner diameter $D_2$ of the medium supporter is sufficiently larger than the diameter $D_1$ of the auxiliary magnetic pole so that a space chamber 8 is formed between the medium supporter 7 and the auxiliary magnetic pole 2.

Positional relationship of the medium supporter 7 including the auxiliary magnetic pole 2 to the main magnetic pole 1 is such that as shown in FIG. 1, the axial center of the auxiliary magnetic pole 2 coincides with the longitudinal direction of the high magnetism-permeable thin film 1a of the main magnetic pole 1, the recording medium 5 being interposed between the medium supporter 7 and the main magnetic pole 1 by a holding jig (not shown) so that a distance H which is greater than the thickness t of the recording medium is maintained between the main magnetic pole 1 and the medium supporter 7. The other end of the conduit 10 connected to the medium supporter 7 is connected to a compression device 11 which compresses a dry fluid such as air to feed the fluid in the cavity as shown by the arrow mark in FIG. 1.

The compression device 11 and conduit 10 constitute a fluid-pressurizing and forwarding means which supplies the fluid into the cavity to urge the recording medium toward the main magnetic pole.

In this embodiment, the dimensions of the diameter $D_1$ of the auxiliary magnetic pole 2, the inner diameter $D_2$ of the medium supporter 7 (the diameter of the cavity), the inner diameter $D_3$ of the conduit 10 (the diameter of the bore) and the space for distance H between the medium supporter 7 and the main magnetic pole 1 have a relation as follows:

$$\pi\left(\frac{D_2^2}{4} - \frac{D_1^2}{4}\right) >> \frac{\pi}{4} D_3^2 >> D_2 \pi(H - t)$$

where t is the thickness of the recording medium.

Namely, there is a relation in the cross-sectional area of the flow path of the cavity formed in the medium supporter > the bore of the conduit > the gap between the magnetic recording medium and the medium supporter.

The operation of the magnetic head having the construction as above-mentioned of the present invention will be described.

A pressure of the pressurized fluid from the compression device pushes the recording medium to the main magnetic pole 1. FIG. 2 shows a distribution in pressure given by the fluid. As shown in the above-mentioned equation, the cross-sectional area perpendicular to the direction of flowing of the fluid, namely, the cross-sectional area of the flow path in the magnetic head is so formed that the cross-sectional area of the chamber 8 is the greatest. Accordingly, a pressure in the vicinity of the high magnetism-permeable thin film 1a of the main magnetic pole is uniform and has a positive value greater than the atmospheric pressure. The fluid pressure gradually decreases toward the outer circumferential portion of the medium supporter 7 from its central portion, and the pressurized fluid is rapidly released at the outer circumferential portion as shown in FIG. 1, with the result that the fluid pressure assumes a negative value slightly smaller than the atmospheric pressure due to an inertial effect and viscosity of the fluid caused by contact with environmental air. Accordingly, the recording medium 5 is uniformly brought into press-contact with the main magnetic pole 1 at or near the high magnetism-permeable thin film 1a to which a sufficient contact is required. On the other hand, the fluid pressure is lower than the atmospheric pressure at or near the outer circumferential portion of the medium supporter 7. Accordingly, the recording medium 5 is controlled by the magnetic pole in a non-contact state by the aid of the fluid. The flat portion 7a constitutes a negative-pressure bearing surface area. As a result, vibrations including the slanting movement of the recording medium which result by deflection of the recording medium at an initial stage of movement and shift of the recording medium are effectively controlled by the negative-pressure bearing area. Accordingly, the state of contact of the recording medium 5 with the main magnetic pole 1 at or near the high magnetism-permeable thin film 1a can be maintained in an extremely stable manner even in the movement of the recording medium. Further, the recording medium 5 is not in contact with the medium supporter 7 by means of the pressurized fluid, and the magnetic head is free from damage even though there is some amount of dust in air whereby breakage of signals such as dropping out can be minimized.

Figure 4:
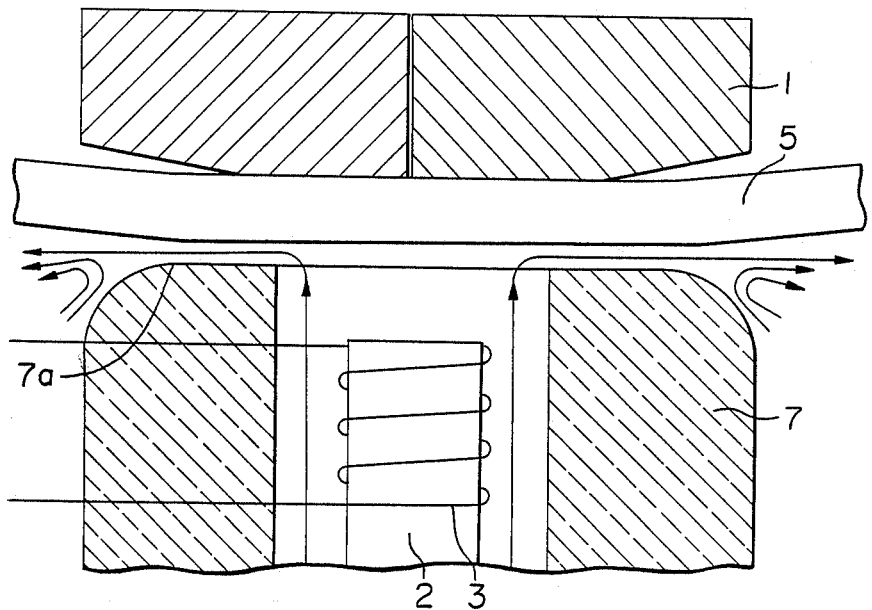
FIG. 4 is an enlarged cross-sectional view of an important part of the medium supporter of the present invention.

FIG. 4 shows another embodiment of the magnetic head according to the present invention. The embodiment has the same construction as the first embodiment provided that the outer circumferential edge of the flat portion 7a is curved in an arch form. With this construction, effect of the negative pressure is increased whereby the recording medium can be supported in a stable manner.

Figure 5:
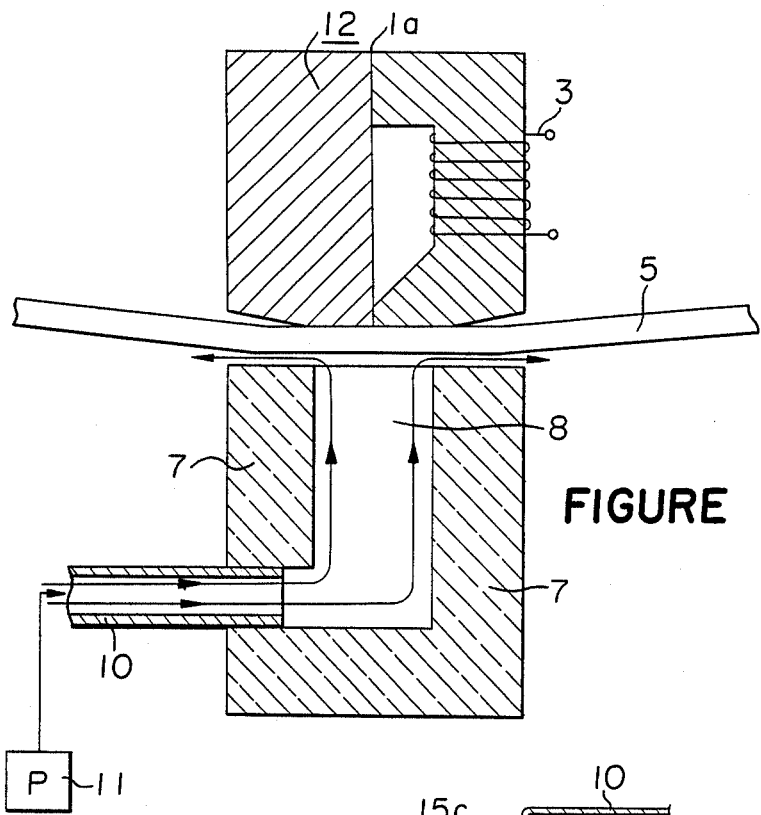
FIG. 5 is a longitudinal cross-sectional view of another embodiment of the magnetic head of the present invention.

In the embodiments described before, description has been made as to the vertically magnetizing and recording head in which the main magnetic pole opposes the auxiliary magnetic pole. However, the same effect can be obtained by a magnetic head comprising a one-piece type magnetic pole 12 in which the auxiliary magnetic pole is arranged in the main magnetic pole as shown in FIG. 5. In FIG. 5, the auxiliary magnetic pole is constituted by winding the coil 3 on a part of a core block.

The embodiments as described above is applicable to a conventional horizontally magnetizing and recording magnetic head.

In the above-mentioned embodiments, the magnetic pole is applicable only to record or reproduce data although description has been made as to the magnetic pole capable of recording and reproducing magnetic signals.

The shape of the cavity formed in the medium supporter can be of a rectangular column or a polygonal column other than the cylindrical form to obtain the same effect.

In the embodiments described above, the recording medium is brought in press-contact with the magnetic pole by a uniform force given by the fluid pressure while it is not in contact with the medium supporter when the recording medium is moved. Accordingly, wearing or damage of the recording medium and the medium supporter due to their mutual contact can be eliminated. The magnetic head of the present invention is so constructed that the fluid pressure is smaller than the atmospheric pressure at the outer circumferential portion of the medium supporter and the negative-pressure bearing area is formed to hold the recording medium in a non-contact state. Accordingly, the slanting movement of the recording medium due to external disturbance such as vibration can be suppressed and a stable contact of the recording medium to the main magnetic pole can be maintained.

Figure 6:
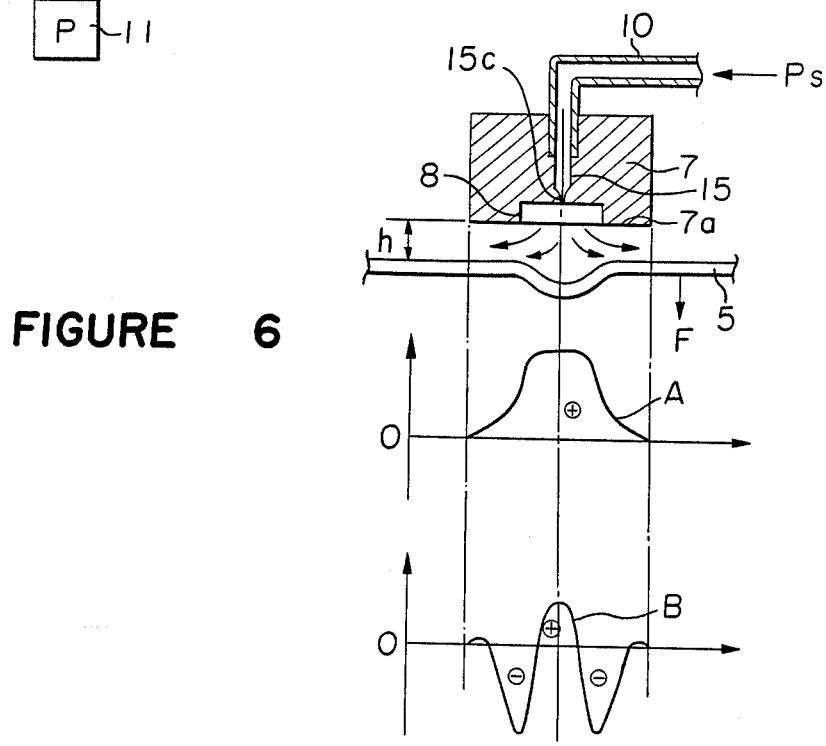
FIG. 6 is a diagram showing the construction and the principle of the medium supporter according to a preferred embodiment of the present invention.

FIG. 6 is a diagram showing the construction and the principle of the medium supporter of a magnetic head which is applicable to the embodiment as shown in FIG. 5, according to a preferable embodiment of the present invention.

In FIG. 6, a reference numeral 15 designates a nozzle having a throttle portion 15c formed in the chamber 8 of the non-magnetic body 7 which is placed opposing the recording medium 5 with a certain gap. The non-magnetic body 7 has a surface (hereinbelow referred to as flat portion) opposing in parallel to the recording medium and a cavity 8 at the center of which the throttle portion 15c of the nozzle 15 is formed to oppose the recording medium. The outer circumference of the flat portion 7a, the cavity 8 and the throttle portion 15c respectively are concentric. A reference numeral 10 designates a conduit of a fluid-pressurizing and forwarding means. A fluid is fed from a compression device (not shown) through the conduit 10 to the recording medium 5 to enter into the cavity 8 in which the nozzle 15 is formed. In FIG. 6, a symbol h represents the gap between the recording medium 5 and the flat surface 7a, a symbol F represents the total load (hereinbelow referred to as a load capacity) which is given to the recording medium 5 by the pressurized air from the nozzle 15, a symbol Ps refers to a pressure for feeding the air, a symbol Pa refers to an atmospheric pressure, a symbol t designates the thickness of the recording medium, a symbol H designates the distance between the magnetic pole 1 and the flat portion 7a.

The operation of the embodiment shown in FIG. 6 will be described. The air from the conduit 10 is ejected from the throttle portion 15c of the nozzle 15 under a pressure Ps. When the gap h between the recording medium 5 and the nozzle 15 is extremely small, i.e. $h < h_0$, the pressure in the cavity 8 is substantially equal to the pressure Ps. In this case, the pressure in the gap h between the flat portion 7a and the recording medium 5 gradually decreases toward the outer circumferential portion of the non-magnetic body due to viscosity of the air.

Namely, in the gap, a pressure greater than the atmospheric pressure Pa is obtained in the entire region of the nozzle 15 as shown in a pressure distribution curve A in FIG. 6.

On the other hand, when the gap h exceeds a predetermined value, i.e., $h > h_0$ the inertial effect of an air stream is dominant, and the pressure suddenly reduces in the region from the outer diameter portion of the cavity 8 to the flat portion 7a so that there produces a pressure smaller than the atmospheric pressure Pa. As a result, there is obtainable the pressure distribution indicated by a curve B in FIG. 6. This phenomenon is well known in a static pressure field as the Bernoulli effect, and it is disclosed "Gas Film Lubrication" by W. A. Gross, published by John Wiley & Sons, Inc. New York, (1962).

The load capacity F given to the recording medium by the pressurized air from the nozzle is expressed by the following equation:

$$F = \int_o^s (Ps - Pa)ds \quad (1)$$

where s represents a position on the flat portion 7a of the non-magnetic body 7 and F has a positive value in the direction separating the recording medium 5 from the non-magnetic body 7 (the direction indicated by the arrow mark in FIG. 6).

Figure 7:
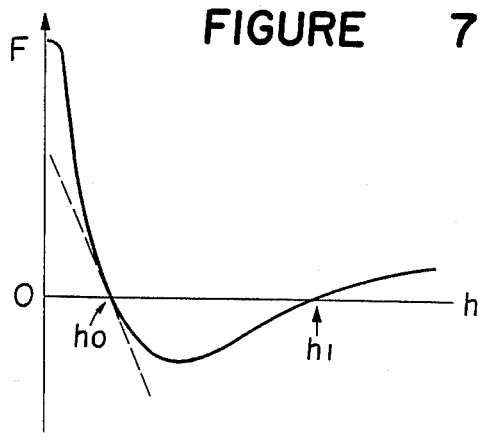
FIG. 7 is a diagram showing a characteristic curve indicative of the principle of the magnetic head according to the present invention.

In FIG. 7, a curve is drawn by the value of the load capacity obtained by the both curves A and B in FIG. 6 for each value of h wherein the smaller one in the values of h rendering the equation (1) to be F=0 is $h_0$ and the larger one is $h_1$ i.e, $h_0$ and $h_1$ are the smaller and larger values satisfying:

$$\int_o^s (Ps - Pa)ds = 0$$

In the above-mentioned embodiment, $h_0$ is about 100 μm in a case of Ps: 0.1 atmospheric pressure or lower, a flow rate : 4 l/min or lower, the diameter of the throttle portion: 0.5 mm, the depth of the cavity 8:1 mm, the diameter of the cavity 8:4 mm, and the outer diameter of the flat portion 7a: 10 mm.

In FIG. 7, it is understandable that $h_0$ is a stably balanced point and $h_1$ is an unstably balanced point. Namely, when h is smaller than $h_1$ and is greater than $h_0$, there exists a force to attract the recording medium 5 toward the nozzle 15. On the other hand, when h is smaller than $h_0$, there is a force to separate the recording medium 5 from the nozzle, hence the recording medium 5 is pushed to the magnetic pole. As a result, a force for self-adjusting functions for the recording medium 5 so that the distance h always becomes $h_0$. On the other hand, when h is greater than $h_1$, there is a force to separate the recording medium 5 from the nozzle with the consequence that the distance h is further increased. Accordingly, if the distance h is smaller than the unstably balanced point $h_1$, the recording medium 5 is not subjected to vibrations due to deformation at an initial stage or external disturbance, and runs in a state of deformation as shown in FIG. 6.

Figure 8:
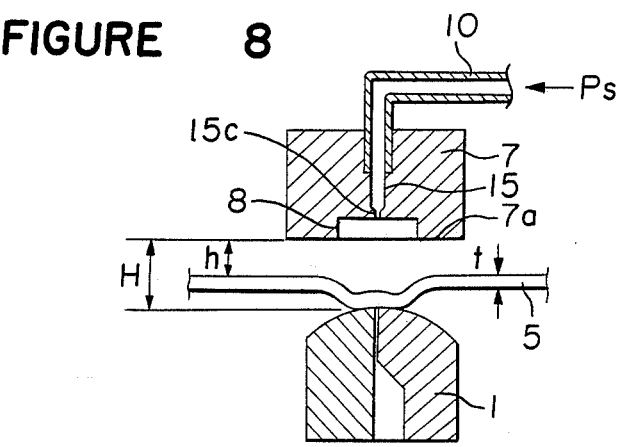
FIG. 8 is a longitudinal cross-sectional view of still another embodiment of the magnetic head of the present invention.

FIG. 8 shows a magnetic head using the nozzle means as shown in FIG. 6. In FIG. 8, the pressurized air is fed to the nozzle 15 to bring the recording medium in contact with the magnetic pole 1 so that the recording medium 5 is kept under the most stable contacting condition during running of it. In FIG. 8, the distance H between the top surface of the magnetic pole 1 and the flat portion 7a of the non-magnetic body 7 should be $H < h_1 + t$ in order to make the distance h formed between the flat surface 7a and the recording medium 2 smaller than $h_1$, where t is the thickness of the recording medium and (H−t) plus the depth of the cavity 8 must be greater than $h_1$ in order that the recording medium will contact the pole 1.

In the embodiment of the present invention, the value of H is determined to be $H \simeq h_0 + t$ in which the value of H depends on the shape of the recording medium 5 which may be deformed depending on the pressure distribution, the shape of the magnetic pole 1 and a pressure to be supplied.

Figure 9:
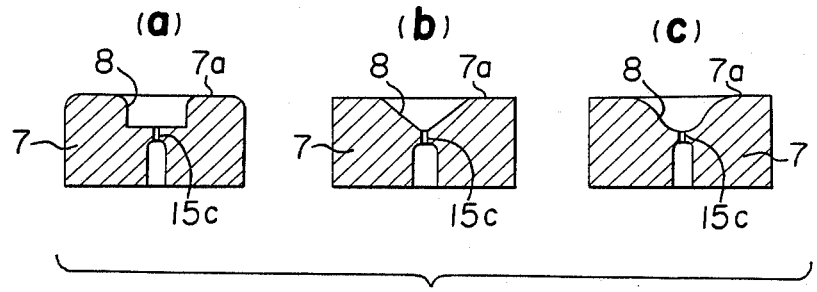
FIGS. 9a through 9c show variations in the shape of the cavity.
Figure 10:
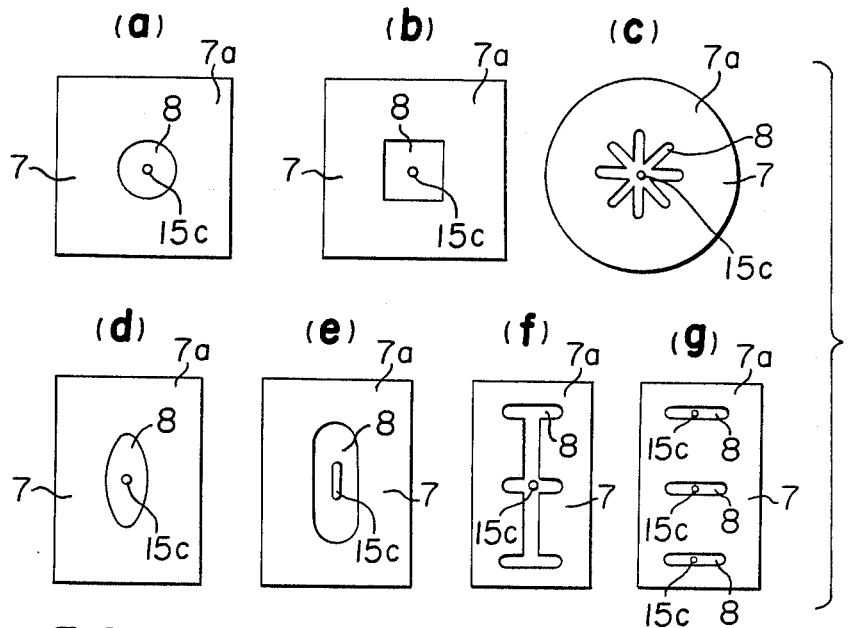
FIGS. 10a through 10g are respectively plane views of other embodiments of the nozzle according to the present invention.
Figure 11:
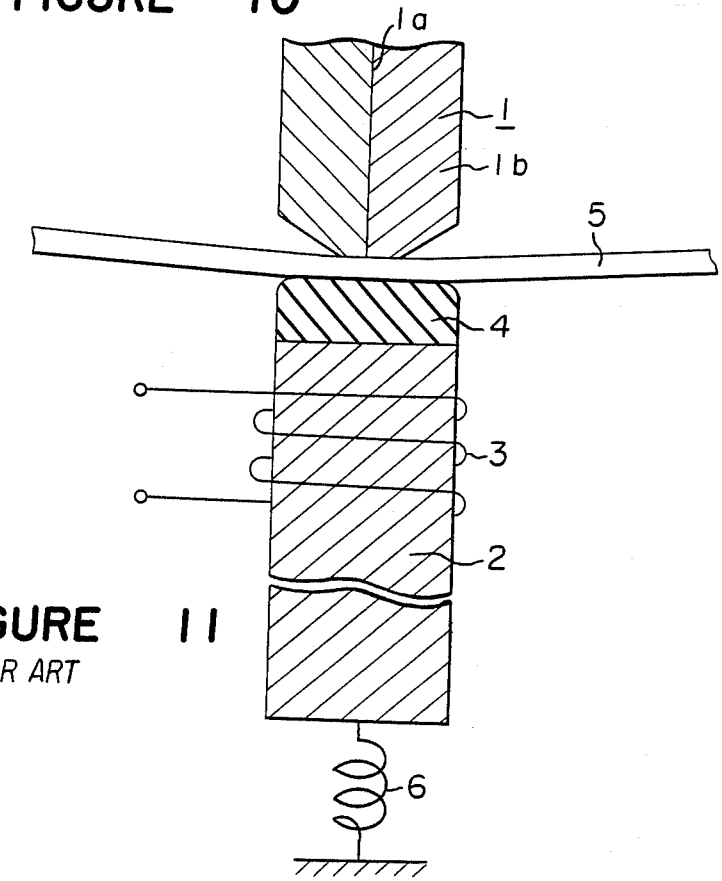
FIG. 11 is a longitudinal cross-sectional view of a conventional magnetic head.
Figure 12:
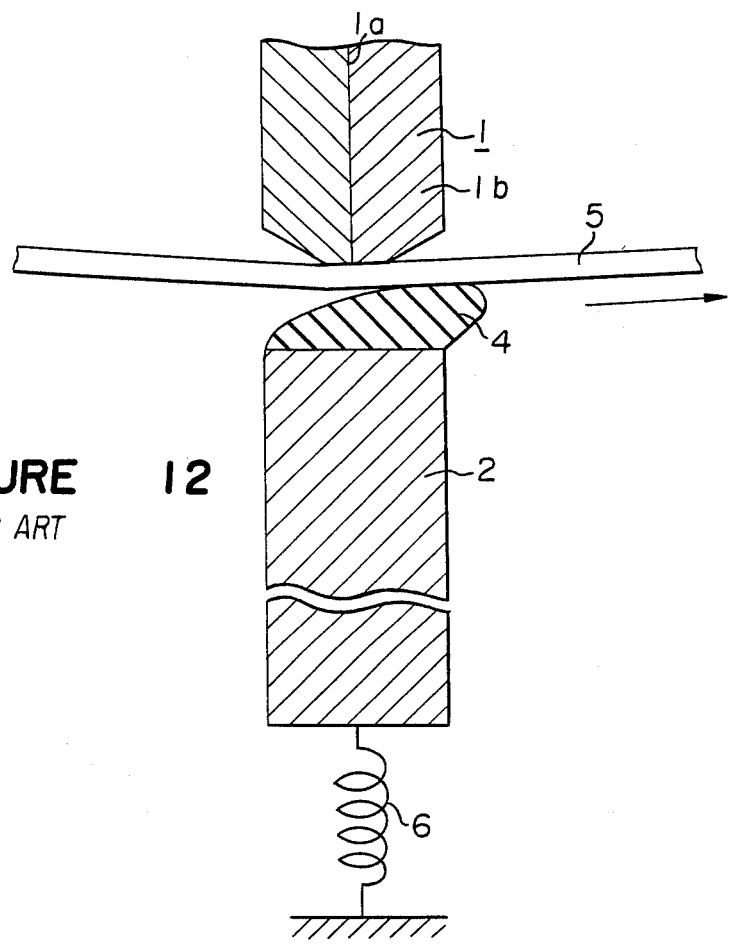
FIG. 12 is a longitudinal cross-sectional view showing the operation of the magnetic head shown in FIG. 11.
Figure 13:
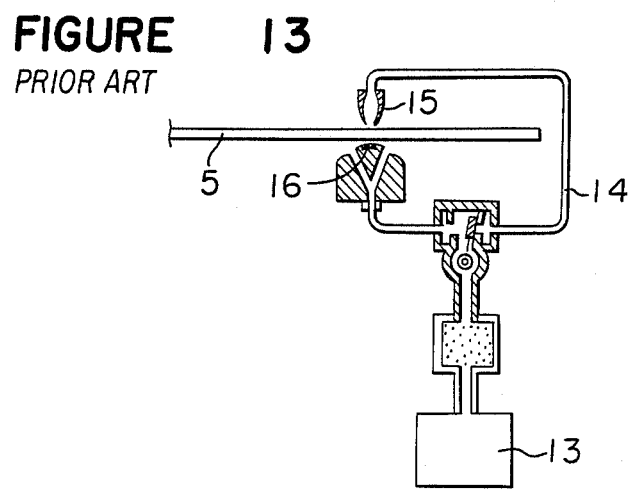
FIG. 13 is a diagram showing another conventional magnetic head.

In the above-mentioned embodiment, the outer circumferential portion of the non-magnetic body 7, the cavity 8 and the throttle portion 15c are respectively concentric and the cavity is in a cylindrical form. The cavity 8 may have a shape other than the cylindrical form as shown in FIG. 9. Namely, the cavity may have rounded corners in cross-section, of a cone or pyramidal shape, or a curved line smoothly connected to the flat portion 7a as shown in FIGS. 9a to 9c.

FIGS. 10a to 10g are plane views showing several other modifications of the cavity 8. The cavity 8 may be circular, rectangular, elongated circular, oval, star-like or in a branched form. The flat portion 7a may be, in plane view, square, rectangular or circular. Further, it may not be in parallel to the recording medium 5 but may have a curved surface. The throttle portion may have an elongated hole, an oval hole or a rectangular form in cross-section. Further, the magnetic head of the present invention may have a plurality of the throttle portions 15c and the cavities 8.

The magnetic head of the present invention is applicable not only to a flexible magnetic disk device but also a recording and reproducing device utilizing a magnetic tape as well.

In accordance with the embodiment as described above, the recording medium is supported at a point as in the conventional device, but in a spreaded surface area constituted by the cavity and flat surface opposing the recording medium whereby control of vibration can be carried out by the positive and negative pressures obtained by the Bernoullis effect to thereby obtainable stable supporting of the recording medium.

What is claimed is:

1. A magnetic head for a moving magnetic medium, comprising:

a magnetic pole having a magnetically sensitive means extending to a first surface past which a magnetic medium moves;

a medium supporter having a second surface facing said first surface such that the magnetic medium may move therebetween, said medium supporter including a central cavity extending to said second surface, said second surface including a flat portion formed around said cavity;

means including a throttle portion for supplying pressurized fluid to said cavity such that said fluid can escape through a space H between said first surface and said flat portion of said second surface, wherein said space H is smaller than $h_1 + t$, wherein $h_1$ is the larger of two values satisfying the equation:

$$\int_o^s (Ps - Pa)ds = 0$$

wherein:

the area of said cavity $> D_2 \pi (H-t)$, s is a position on said second surface, $D_2$ is the diameter of said cavity, t is equal to the thickness of the tape, Pa is atmosphere pressure, Ps is the pressure of said pressurized fluid in said cavity, and wherein $(H-t)$ plus the depth of said cavity is greater than $h_1$, whereby the magnetic medium contacts said first surface at said magnetic medium and whereby said magnetic medium is supported by said supporter via a film of said fluid.

2. The magnetic head according to claim 1, wherein an outer periphery of the flat portion of said medium supporter is curved.

3. The magnetic head according to claim 1, wherein said magnetic pole comprises means to record a magnetic signal in said magnetic recording medium.

4. The magnetic head according to claim 1, wherein said magnetic pole comprises means to reproduce data recorded in said magnetic recording medium.

5. The magnetic head according to claim 1, wherein an auxiliary magnetic pole provided in said cavity of said medium supporter.

6. The magnetic head according to claim 1, wherein said means for supplying pressurized fluid comprises means for compressing a fluid and a conduit for introducing said fluid from said compression means to said cavity.

7. The magnetic head according to claim 1, wherein said magnetic pole is used to record a magnetic signal in said magnetic recording medium.

8. The magnetic head according to claim 1, wherein said magnetic pole is used to reproduce data recorded in said magnetic recording medium.

9. The magnetic head of claim 1 wherein H is approximately equal to ho+t, wherein ho is the smaller of two values satisfying the equation $$\int_o^s (Ps - Pa)ds = 0.$$

* * * * *